April 29, 1969   K. DACHS ET AL   3,440,668
ARTIFICIAL LIMBS OF EXPANDED POLYAMIDES
Filed Sept. 1, 1965
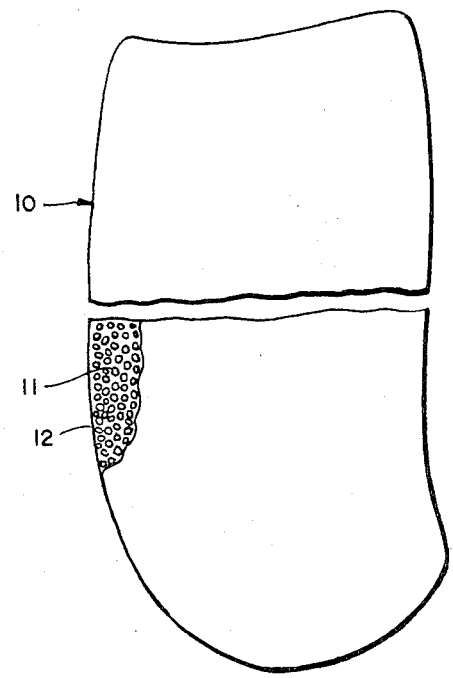
INVENTORS:
KARL DACHS
HANS WILHELM
KURT WICK
WOLFGANG SCHWENKE
MAX NAEDER
BY: *Marzall, Johnston, Cook & Root*
ATT'YS

United States Patent Office 3,440,668
Patented Apr. 29, 1969

3,440,668
ARTIFICIAL LIMBS OF EXPANDED POLYAMIDES
Karl Dachs and Hans Wilhelm, Ludwigshafen (Rhine), Kurt Wick, Frankenthal, Palatinate, Wolfgang Schwenke, Ludwigshafen (Rhine), and Max Naeder, Duderstadt, Germany, assignors to Badische Anilin- & Soda-Fabrik Aktiengesellschaft, Ludwigshafen (Rhine), Rhineland, Pfalz, Germany
Filed Sept. 1, 1965, Ser. No. 484,447
Claims priority, application Germany, Sept. 11, 1964, B 78,481
Int. Cl. A61f *1/06, 1/08;* B29d *31/00*
U.S. Cl. 3—1                3 Claims

ABSTRACT OF THE DISCLOSURE

Molded prosthetic limbs, hands and feet having body of fine pored, foamed polylactam, and characterized by toughness, wear resistant, smooth surface, high impact strength, and thermal suitability.

---

This invention relates to artificial limbs of expanded polyamides which have been prepared in a mold by activated anionic polymerization of lactams in the presence of substances which form gaseous products when heated.

It is known that wood or plastics, such as cured unsaturated polyester resins or hard foam based on polyurethanes, may be used as the material for artificial limbs, for example for arm or leg prosthesis. Wood does not have sufficient dimensional stability for this purpose and moreover has too low an elasticity and a relatively short life. Limbs made from cured unsaturated polyester resins have too little resistance to wear. As a result, securing means embedded in the polyester, which connect the joint with other prosthesis members, readily become loose. Hard polyurethane foam also has these disadvantages. Moreover, it has little scratch resistance and has such a low dimensional stability under heat that deformation may occur even under the direct influence of the sun's radiation.

We have now found that synthetic limbs of expanded polyamides do not have the said disadvantages.

This was not to be expected because it is known that the strength characteristics of expanded plastics are considerably worse than those of unexpanded plastics.

Thus for example unexpanded polyurethanes are very resistant to wear and scratching and have a much greater thermal stability under load than hard polyurethane foam.

Artificial limbs have particularly advantageous properties when they are made of polyamides which have been prepared by activated anionic polymerization of lactams in the presence of substances which form gaseous products when heated and in heated molds by the method according to British patent specification No. 918,059. The term "activated anionic polymerization of lactams" is taken to mean the polymerization of lactams having five to thirteen ring members in the presence of activators, such as substituted ureas, guanidines or urethanes, and catalysts, such as alkali metal lactamates. Polyamide artificial limbs having particularly uniform pore structure are obtained. The unit weight of the expanded polyamides may easily be adapted to the intended use. In general polyamide foam having a unit weight of from 250 to 400 g./l. is used, but artificial limbs of polyamides whose unit weight is less than 250 g./l. have an adequate strength.

Artificial limbs which have been prepared for example by conventional polycondensation of salts of the type of diamine/dicarboxylic acid or $\omega$-aminocarboxylic acid or their polymerizable derivatives in the presence of conventional catalysts followed by expansion in molds for example in accordance with the process described in U.S. patent specification No. 3,065,189 and German patent specification No. 1,154,625 are also suitable for use according to this invention.

Parts made from expanded polyamides have a particularly wear resistant, smooth surface and are tough. The surface skin is scratch resistant; it encloses a fine-pored polyamide foam structure which imparts to the artificial limbs a particularly high impact strength. The moldings are moreover resistant to elevated temperatures up to more than 150° C.

Arm, leg or hand prosthesis are made in the conventional ways using the said polyamide members.

In the drawing:

The figure illustrates a side elevation, in fragment and partly broken away, of a thigh prosthesis.

Referring to the drawing, the thigh prosthesis 10 is a molded body having the general shape of a human thigh. The surface skin 12 encloses the fine-pored polyamide foam structure 11.

The invention is illustrated by the following example. The parts are by weight.

EXAMPLE

Preparation of the starting solutions:

Solution A 394 parts of $\epsilon$-aminocaprolactam is fused and 123 parts of a solution of sodium lactamate in lactam (prepared in conventional manner from 3 parts of sodium and 97 parts of caprolactam) is added. 10 parts of gypsum (hemihydrate) and 16 parts of a mixture of linear hydrocarbons (boiling range 60° to 180° C.) are then added.

Solution B 98.6 parts of $\epsilon$-aminocaprolactam is fused and 61.5 parts of bis-(caprolactam-N-carboxylic acid)-hexamethylenediamine-1,6 is added.

Solutions A and B are heated separately to about 130° C. and mixed and the reaction mixture is poured into a hollow metal mold heated to 170° C. which has the shape of the thigh portion of a leg prosthesis. The mold has a capacity of 2200 cc. Forty-five seconds later the expansion and polymerization are completed. Ten minutes are allowed for cooling and then the mold is removed from the expanded molding. The unfinished product has a unit weight of 320 g./l., very good mechanical strength and a thermal stability under load of 150° C. It can be polished, milled, sawn or drilled.

We claim:
1. A molded human limb prosthesis of good mechanical and high impact strengths comprising a body of fine-pored foamed polylactam produced by activated anionic polymerization of a lactam and having the general shape of a part of a human limb, the lactam component of said polylactam having 5 to 13 ring members, said body having a surface skin which is scratch resistant and enclosing the fine-pored polylactam foam structure, said foamed polylactam having a unit weight of 250 to 400 grams per liter and being stable under load at a temperature of 150° C.

2. A prosthesis as claimed in claim 1, wherein said lactam is caprolactam.

3. A prosthesis as claimed in claim 1, wherein said prosthesis is a human leg prosthesis having the general shape of a part of a human leg.

References Cited

UNITED STATES PATENTS

| | | | |
|---|---|---|---|
| 3,098,239 | 7/1963 | Nader | 3—7 |
| 3,335,428 | 8/1967 | Gajdos | 3—7 |
| 3,322,696 | 5/1967 | Fisher et al. | |

FOREIGN PATENTS

| | | |
|---|---|---|
| 918,059 | 2/1963 | Great Britain. |
| 615,595 | 1/1961 | Italy. |
| 908,377 | 10/1962 | Great Britain. |

PHILIP E. ANDERSON, *Primary Examiner.*

U.S. Cl. X.R.

260—2.5, 41; 264—54